United States Patent [19]
Irie

[11] Patent Number: 5,570,606
[45] Date of Patent: Nov. 5, 1996

[54] REDUCTION GEAR DEVICE

[75] Inventor: Hideyuki Irie, Tokyo, Japan

[73] Assignee: Asahi Kogaku Kogyo Kabushiki Kaisha, Tokyo, Japan

[21] Appl. No.: 393,500

[22] Filed: Feb. 24, 1995

[30] Foreign Application Priority Data

Feb. 24, 1994 [JP] Japan .................................. 6-026701

[51] Int. Cl.⁶ .................................................. F16H 55/22
[52] U.S. Cl. ........................ 74/89.14; 74/425; 74/606 R
[58] Field of Search .................... 74/89.14, 425, 74/606 R; 354/173.1

[56] References Cited

U.S. PATENT DOCUMENTS

| 4,094,207 | 6/1978 | Fischer | 74/425 |
| 4,158,483 | 6/1979 | Fisher et al. | 74/89.14 X |
| 4,441,800 | 4/1984 | Nakano | 354/173.1 X |
| 4,663,635 | 5/1987 | Wu | 74/89.14 X |
| 4,686,863 | 8/1987 | Inoue et al. | 74/425 |
| 5,063,316 | 11/1991 | E-Ming | 74/89.14 X |

FOREIGN PATENT DOCUMENTS

| 2155948 | 5/1973 | Germany | 74/425 |
| 1192946 | 8/1986 | Japan | 74/425 |
| 1553966 | 3/1990 | U.S.S.R. | 74/425 |

Primary Examiner—Charles A. Marmor
Assistant Examiner—Troy Grabow
Attorney, Agent, or Firm—Greenblum & Bernstein P.L.C.

[57] ABSTRACT

A gear reduction unit, having first and second worm gears, includes a support member shaped such that a combined gear unit, having the second worm and a first worm gear coaxially formed therein, is held in an operating position by the first worm and a second worm gear engaging the second worm and first worm gear, respectively.

7 Claims, 3 Drawing Sheets

REDUCTION GEAR DEVICE

BACKGROUND OF THE INVENTION

The present invention relates to reduction gear units, and more particularly, to reduction units employing worm gear components.

Worm gear reduction gear units are well known. For example, a worm gear reduction unit employing two sequential worm units at right angles to each other is conventional. Such a unit has a first worm, directly driven by a motor, driving a pinion which is coaxial with a second worm. The second worm drives a final gear used to drive some mechanical element.

In the conventional double-worm reduction unit, assembly of the second worm is difficult. For example, the second worm may have an intermediate spring provided about the shaft, such that the overall length of the shaft may be shortened and then inserted between two mounting holes provided in a monoblock support, where the shaft is allowed to expand and the second worm is thereby assembled in the block. Alternatively, the second worm may be provided with rectangular bearing blocks at both ends of the shaft, and the bearing blocks may be slid into a monoblock housing and adhered, thus securing the worm.

In both cases, assembly of the double-worm reduction unit requires extra parts, and is inconvenient to carry out. Furthermore, when the elements of the reduction unit are extremely small, such as those used in cameras or other precision equipment, utilizing miniature spring-loaded worm elements or bearing blocks is difficult and time-consuming.

SUMMARY OF THE INVENTION

It is therefore an object of the present invention to provide an improved double-worm gear reduction unit that both reduces the number of parts required, and is easy to assemble.

According to one aspect of the present invention, a worm gear reduction unit employing two worms includes a support member, having a pair of arms provided thereto, each of the arms having a reference surface formed therein. A rotatable shaft and a first worm pinion, fixedly and coaxially mounted to the rotatable shaft between the ends of the rotatable shaft are provided. A first worm, rotatably supported in the support member engages the first worm pinion. The first worm is able to hold the rotatable shaft in an operating position, supported at the reference surfaces, by engaging the first worm pinion. A second worm, fixedly and coaxially mounted to the rotatable shaft between the ends of the rotatable shaft is also provided. A second worm pinion, engages the second worm, and being able to hold the rotatable shaft in an operating position, supported at the reference surfaces, by engaging the second worm.

According to another aspect of the present invention, a worm gear reduction unit employing two worms includes: a support member, having a pair of arms formed therein. Each arm has a U-shaped groove which has an open end and; a rotatable shaft, rotatably supported at either end of the pair of arms in the U-shaped grooves. A first worm pinion, is fixedly and coaxially mounted to the rotatable shaft between the ends of the shaft. A first worm is, rotatably supported in the support member and engages the first worm pinion. The first worm is able to hold the first shaft in the U-shaped grooves by engaging the first worm pinion. A worm, is fixedly and coaxially mounted to the rotatable shaft between the ends of the shaft. A second worm pinion, engages the second worm, and is able to hold the first shaft in the U-shaped grooves by engaging the second worm.

According to still another aspect of the present invention, a worm gear reduction unit includes: a support member, which has a pair of arms formed therein, each arm having a U-shaped groove having an open end. A rotatable shaft, is rotatably supported at either end of the pair of arms in the U-shaped grooves. A worm pinion, is fixedly and coaxially mounted to the rotatable shaft between the ends of the shaft. A motor is provided having a mounting sleeve, which is press-fit to a hole formed in the support member. The motor includes a driven shaft and a worm, coaxially provided to the driven shaft of the motor and engaging the worm pinion, so that the first worm is able to hold the first shaft in the U-shaped grooves by engaging the first worm pinion.

DESCRIPTION OF THE ACCOMPANYING DRAWINGS

DESCRIPTION OF THE EMBODIMENTS

Figure 1:
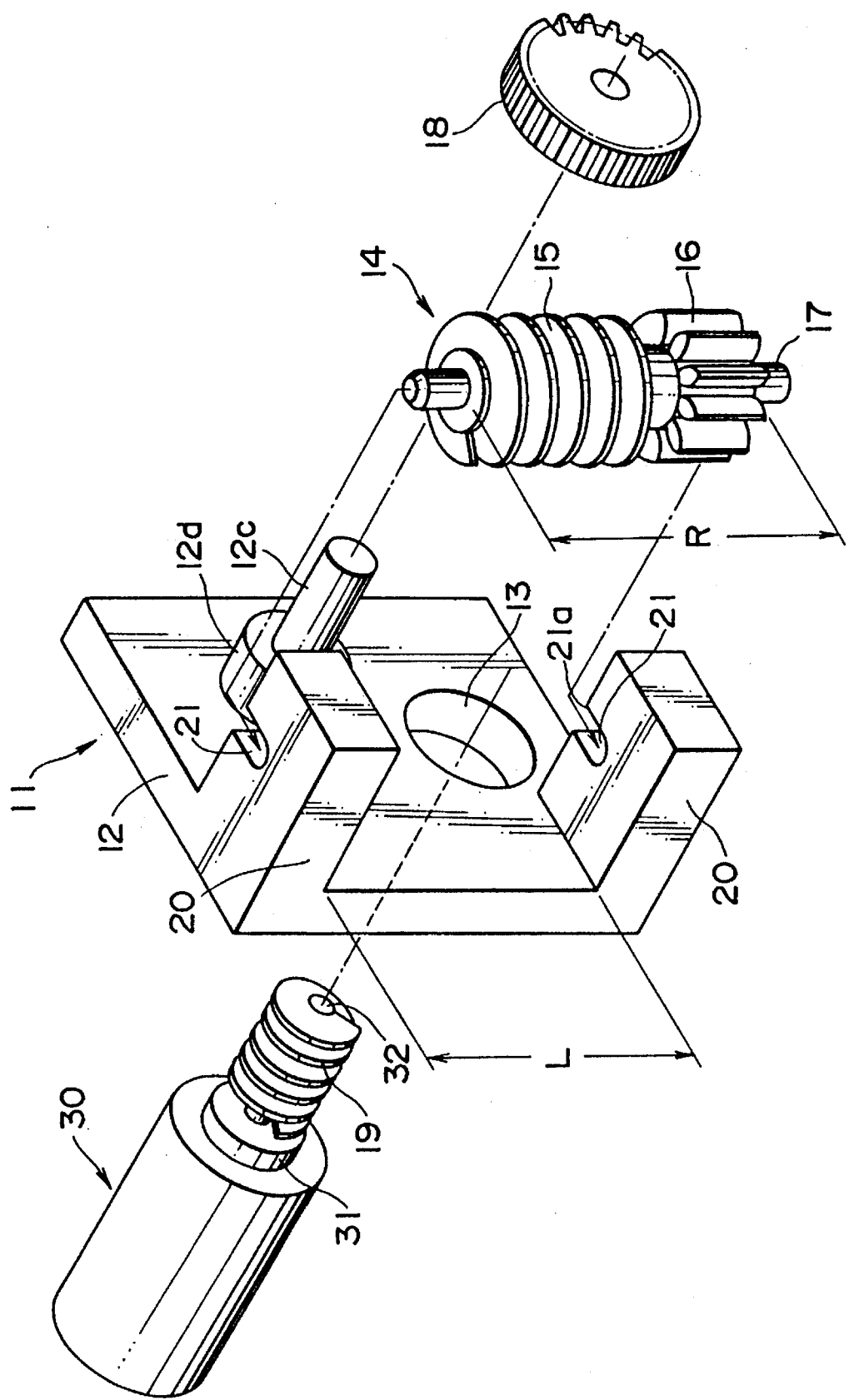
FIG. 1 is an exploded perspective view of an embodiment of a double-worm reduction unit according to the invention.

An embodiment of a double-worm reduction unit 10 to which the present invention is applied is shown in an exploded perspective view in FIG. 1.

The reduction unit includes: a monoblock support 11, a motor 30, a first worm 19, a first worm pinion 16, a second worm 15, and a second worm pinion 18.

The monoblock support 11 is made from plastic or metal. The support 11 has a rear plate member 12 that supports the other elements of the reduction unit 10. The plate member 12 has a hole 13 formed therein, larger than the diameter of the first worm 19, through which the first worm 19 is inserted during assembly. The hole 13 also supports the motor 30 (via a support sleeve 31). The plate member 12 also supports a rotatable output shaft 12c at a bearing 12d. The monoblock support 11 further includes a pair of support arms 20, 20, provided to the rear support plate 11. The support arms 20, 20 are separated from one another by a distance L as shown in FIG. 1. The support arms 20, 20 rotatably support the second worm 15 and the first worm pinion 16.

The motor 30 includes a mounting sleeve 31, which is sized to be press-fit into the hole 13 formed in the rear support plate 12 of the monoblock support 11. The first worm 19 is mounted to a motor shaft 32 of the motor 30.

The second worm pinion 18 is fixedly mounted to the rotatable output shaft 12c, and the output shaft 12c is used as a final drive of the reduction unit 10.

The second worm 15 and first worm pinion 16 together comprise a combined gear 14. The combined gear 14 includes a shaft 17 to which the second worm 15 and the first worm pinion 16 are coaxially and fixedly mounted, such that the second worm 15 and first worm pinion 16 rotate together. The shaft 17 extends beyond the second worm 15 at the top of the combined gear 14, and beyond the first worm pinion 16 at the bottom of the combined gear 14. The distance R between the top of the second worm 15 and the bottom of the first worm gear 16 is just less than the distance between the support arms 20, 20 (FIG. 1).

The support arms 20, 20, are each provided with a U-shaped mounting groove 21. The inner surface of each mounting groove 21 provides a reference surface. The open end of the U-shape of each of the mounting groove 21, 21, faces the interior of the monoblock support 11, where the first worm 19 and second worm pinion 18 are positioned when the reduction unit is assembled. The width of each groove 21, 21 is slightly wider than the diameter of the shaft 17 of the combined gear 14. The distance R, between the arms 20, 20, L, is just longer than the distance between the top of the second worm 15 portion and the bottom of the first worm pinion 16 portion of the combined gear 14, such that the shaft 17 may be rotatably supported in the two grooves 21, 21.

Figure 3A:
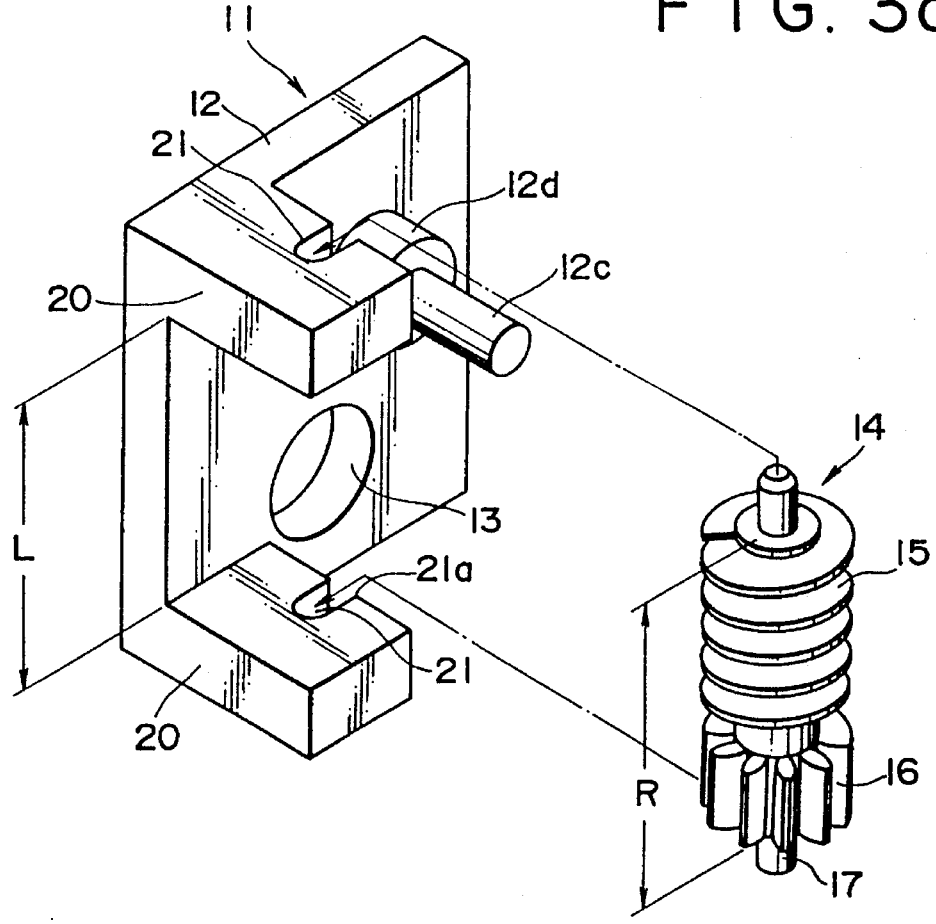
FIG. 3(a) is an exploded perspective view showing how a second worm of an embodiment of a double-worm reduction unit according to the invention may be assembled.

FIG. 3(a) is an exploded perspective view of the monoblock support 11 and combined gear 14, showing how a first step of an assembly procedure may be accomplished. At this point, the output shaft 12c is already rotatably mounted to the monoblock support by the bearing 12d. The combined gear 14 is inserted such that the ends of the shaft 17 fit into the open ends of the U-shaped grooves 21, 21 of the support arms 20, 20. The shaft is restrained from radial movement, except in the direction of the open end of the U-shaped grooves 21, 21 by the inner reference surfaces of the U-shaped grooves 21, 21. The combined gear 14 is thereby rotatably supported by the monoblock support 11.

Figure 3B:
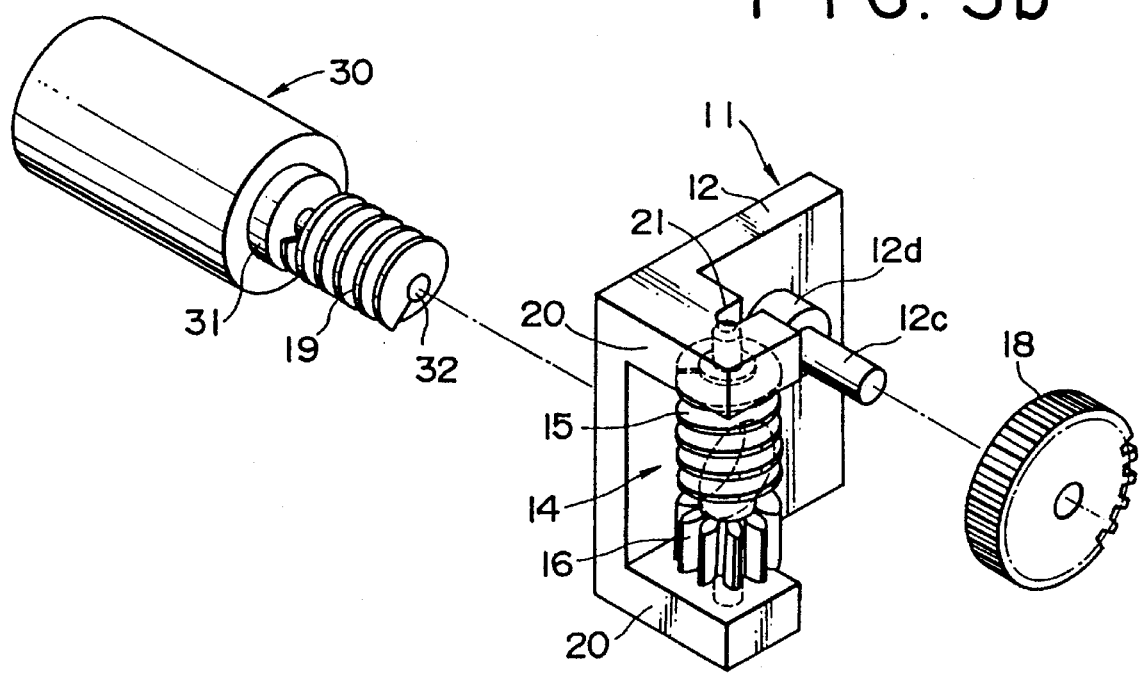
FIG. 3(b) is an exploded perspective view showing how a first worm and final drive gear of an embodiment of a double-worm reduction unit according to the invention may be assembled.

FIG. 3(b) is an exploded perspective view of the monoblock support 11, combined gear 14, motor 30, first worm 19, and second worm pinion 18. At this point, the first worm 19 is already mounted to the shaft 32 of the motor 30. The first worm 19 is inserted through the hole 13, and engages the first worm pinion 16. The first worm pinion 16 is already rotatably supported by the monoblock support 12 (as part of combined gear 14), but cannot move in the direction of the first worm 19. In order to fully insert the first worm 19, one of the first worm 19 or first worm pinion 16 is rotated. As the first worm 19 comes fully into the proper engagement, the mounting sleeve 31 of the motor 30 engages the hole 13, and the mounting sleeve 31 is press-fit into the hole 13, securing the motor 30 in place. Now, the second worm pinion 18 is mounted on the shaft 12c, engaging the second worm 15 as it is mounted. Thus, the engagements of both the first worm 19 and first worm pinion 16, and of the second worm 15 and the second worm pinion 18, are correct for the proper operation of the reduction unit 10.

Figure 2:
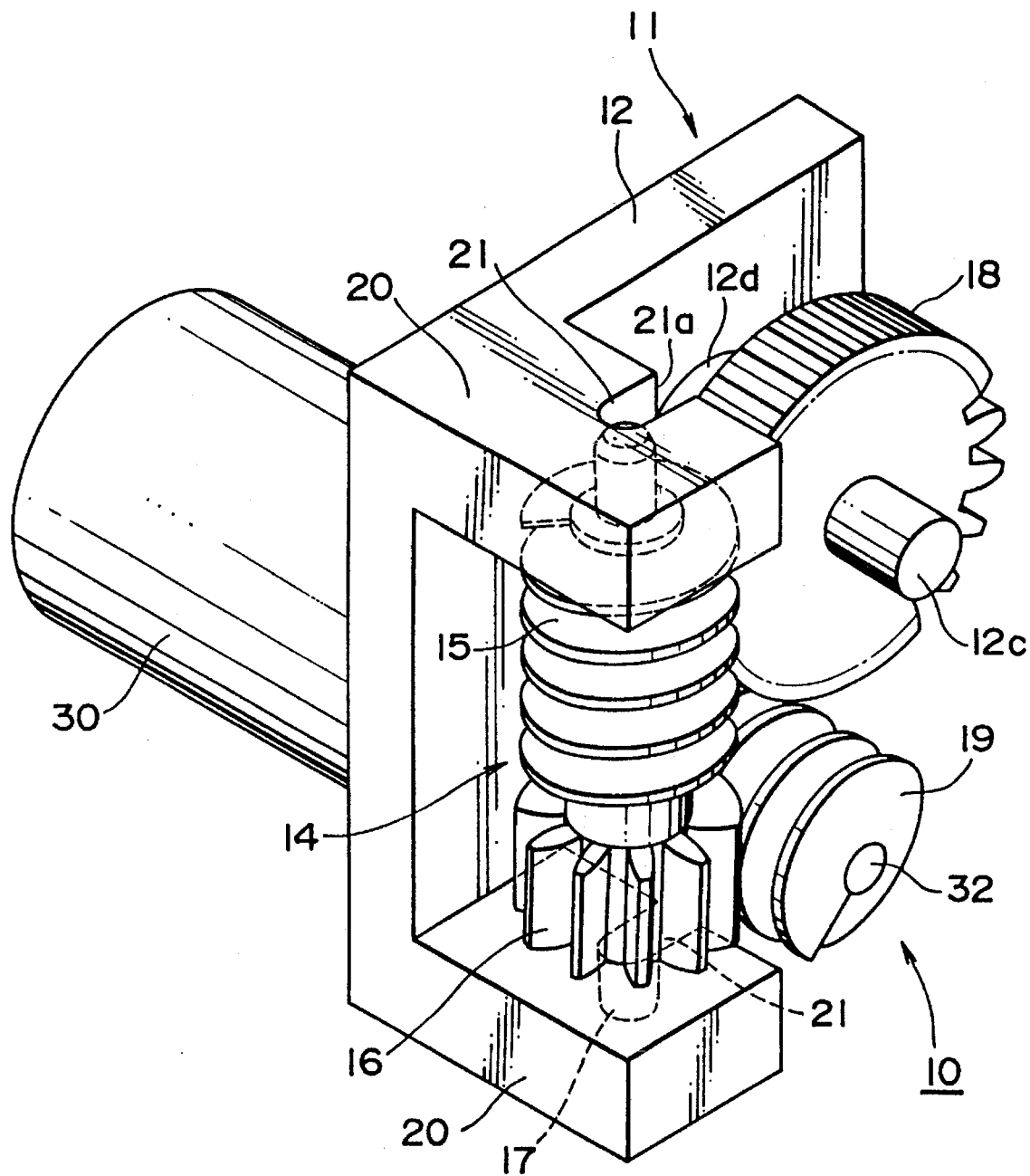
FIG. 2 is a perspective view of an embodiment of an assembled double-worm reduction unit according to the invention.

By the mounting of the motor 30 and first worm 19 through the hole 13, the engagement of the first worm 19 and first worm pinion 16 holds the combined gear 14 in place in the U-shaped grooves 21, 21, with most of the holding contact being towards the bottom of the combined gear 16. As the second worm pinion 18 engages the second worm 15, the combined gear 14 is held in the U-shaped grooves 21, 21 by the engagement, and the contact force holding the combined gear 14 in place in the grooves 21, 21 is substantially equal at top and bottom. When the entire reduction unit 10 is assembled, the combined gear 14 is rotatably supported in U-shaped grooves 21, 21. Even though the U-shaped grooves are each open on one end, the combined gear is held in place (against the inner reference surfaces of the U-shaped grooves 21, 21) by the engagement of worms 19 and 15 and pinions 16 and 18, respectively, as shown in FIG. 2. According to this embodiment of the invention, no springs, bearing blocks, or other parts are needed to assemble the second worm 15 and first worm pinion 16 in the reduction unit 10.

Thus, the embodiment of a double-worm reduction unit 10 according to the invention reduces the number of parts necessary to assemble a functional unit 10. Furthermore, assembly is easily accomplished in a few steps.

The present disclosure relates to subject matter contained in Japanese Patent Application No. HEI 06-026701, filed on Feb. 24, 1994, which is expressly incorporated herein by reference in its entirety.

What is claimed is:

1. A worm gear reduction unit employing two worms, said reduction unit comprising:

a support member, having a pair of arms, each of said arms having a reference surface formed therein;

a rotatable shaft rotatably supported at either end at said reference surfaces of said pair of arms;

a first worm pinion, fixedly and coaxially mounted to said rotatable shaft between ends of said rotatable shaft;

a first worm, rotatably supported in said support member and engaging said first worm pinion, said first worm holding said rotatable shaft in an operating position, supported at said reference surfaces of said arms, by engaging said first worm pinion;

a second worm, fixedly and coaxially mounted to said rotatable shaft between said ends of said rotatable shaft; and a second worm pinion, engaging said second worm, and holding said rotatable shaft in an operating position, supported at said reference surfaces, by engaging said second worm.

2. The reduction unit according to claim 1, wherein said rotatable shaft is supported by said reference surfaces on one circumferential side of said shaft, and said rotatable shaft is held in said operating position on an opposite circumferential side of said shaft.

3. The reduction unit according to claim 1, wherein said first worm is provided to a motor, and said second worm pinion is mounted to an output shaft.

4. The reduction unit according to claim 3, wherein said motor is mounted to said support member, and said output shaft is rotatably provided to said support member.

5. A worm gear reduction unit employing two worms, said reduction unit comprising:

a support member, having a pair of arms formed therein, each arm having a U-shaped groove having an open end;

a rotatable shaft, rotatably supported at either end by said U-shaped grooves of said pair of arms;

a first worm pinion, fixedly and coaxially mounted to said rotatable shaft between said ends of said rotatable shaft;

a first worm, rotatably supported in said support member and engaging said first worm pinion, said first worm holding said rotatable shaft in said U-shaped grooves by engaging said a second worm, fixedly and coaxially mounted to said rotatable shaft between said ends of said rotatable shaft; and a second worm pinion, engaging said second worm, and holding said rotatable shaft in said U-shaped grooves by engaging said second worm.

6. A worm gear reduction unit, comprising:

a support member, having a pair of arms formed therein, each arm having a U-shaped groove having an open end;

a rotatable shaft, rotatably supported at either end by said U-shaped grooves of said pair of arms;

a worm pinion, fixedly and coaxially mounted to said rotatable shaft between said ends of said rotatable shaft;

a motor having a mounting sleeve, said mounting sleeve press-fit to a hole formed in said support member, said motor comprising a driven shaft; and a worm, coaxially provided to said driven shaft of said motor and engaging said worm pinion, said worm holding said rotatable shaft in said U-shaped grooves by engaging said worm pinion.

7. A worm gear reduction unit employing two worms, said reduction unit comprising:

a support member, having a pair of arms extending therefrom, each of said arms having a reference surface formed therein;

a motor supported by said support member, said motor having a drive shaft;

a first worm coaxially provided to said drive shaft of said motor;

a first worm pinion engaged by and driven by said first worm;

a rotatable shaft coaxially supporting said first worm pinion, said engagement of said first worm to said first worm pinion holding said rotatable shaft at either end of the shaft against said reference surfaces formed in said arms;

a second worm formed on said rotatable shaft coaxially with said first worm pinion and driven with said first worm pinion; and a second worm pinion engaged to and driven by said second worm, said engagement of said second worm pinion to said second worm holding said rotatable shaft against said reference surfaces formed in said arms, said second worm pinion being rotatably supported by a shaft formed in said support member.

\* \* \* \* \*

UNITED STATES PATENT AND TRADEMARK OFFICE
CERTIFICATE OF CORRECTION

PATENT NO. : 5,570,606
DATED : November 5, 1996
INVENTOR(S) : H. IRIE

It is certified that error appears in the above-indentified patent and that said Letters Patent is hereby corrected as shown below:

On the cover, in section [56], "References Cited", "U.S. PATENT DOCUMENTS", insert ---4,194,824   3/1980   Arai et al. ........354/173---.

On the cover, in section [56], "References Cited", "U.S. PATENT DOCUMENTS", insert ---4,498,759   2/1985   Ogawa et al. ........355/8.

On the cover, in section [56], "References Cited", "U.S. PATENT DOCUMENTS", insert ---5,012,262   4/1991   Mogamiya et al. ........354/149.1---.

At column 4, line 62 (claim 5, line 13), after "by engaging said" insert ---first worm pinion;---.

Signed and Sealed this

Eleventh Day of March, 1997

Attest:

BRUCE LEHMAN

Attesting Officer      Commissioner of Patents and Trademarks